United States Patent
Kim et al.

(10) Patent No.: US 12,474,993 B2
(45) Date of Patent: Nov. 18, 2025

(54) MEMORY DEVICES PERFORMING SELECTIVE POST PACKAGE REPAIR, ELECTRONIC DEVICES INCLUDING THE SAME, AND OPERATING METHODS OF THE SAME

(71) Applicant: SAMSUNG ELECTRONICS CO., LTD., Suwon-si (KR)

(72) Inventors: Taekhoon Kim, Suwon-si (KR); June-Hyun Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 51 days.

(21) Appl. No.: 18/623,837

(22) Filed: Apr. 1, 2024

(65) Prior Publication Data

US 2024/0362109 A1  Oct. 31, 2024

(30) Foreign Application Priority Data

Apr. 25, 2023 (KR) .......................... 10-2023-0054011

(51) Int. Cl.
   *G06F 11/10* (2006.01)
(52) U.S. Cl.
   CPC .................................. *G06F 11/10* (2013.01)
(58) Field of Classification Search
   CPC .. G06F 11/10; G06F 11/1048; G06F 11/1068; G11C 29/18; G11C 29/40; G11C 29/44; G11C 29/76
   See application file for complete search history.

(56) References Cited

U.S. PATENT DOCUMENTS

| | | | |
|---|---|---|---|
| 9,201,730 B2 | 12/2015 | Roohparvar | |
| 9,202,595 B2 | 12/2015 | Wilson et al. | |
| 9,870,293 B2 | 1/2018 | Lee et al. | |
| 9,941,023 B2 | 4/2018 | Warnes et al. | |
| 10,403,387 B2 | 9/2019 | You | |
| 2008/0247243 A1* | 10/2008 | Kang | G11C 29/70 365/230.03 |
| 2021/0064462 A1* | 3/2021 | Eun | G11C 11/40615 |
| 2021/0375379 A1* | 12/2021 | Lim | H01L 25/18 |

FOREIGN PATENT DOCUMENTS

KR            102412610 B1      6/2022

\* cited by examiner

*Primary Examiner* — Shelly A Chase
(74) *Attorney, Agent, or Firm* — Wolf, Greenfield & Sacks, P.C.

(57) ABSTRACT

Disclosed is a memory device which includes a plurality of memory chips. Each of the plurality of memory chips, in response to a post package repair (PPR) command and a target value received from a controller, performs a write operation of write data with respect to memory cells corresponding to a row address generated in a PPR mode executed in response to the PPR command, performs read operation with respect to the memory cells, resulting in read data, generates a comparison signal based on a result of comparing the write data and the read data programs the row address corresponding to the comparison signal as a selected fail row address, and writes the write data in redundancy memory cells, which are connected to a redundancy word line used to replace a fail word line corresponding to the selected fail row address, from among the plurality of memory cells.

20 Claims, 12 Drawing Sheets

FIG. 6A

| FG | sFRA |
|---|---|
| L → H | sFRA0(WL1) |
| L → H | sFRA1(WL4) |
| L | sFRA2 |
| ⋮ | ⋮ |
| L | sFRAk-1 |

FIG. 6B

| FG | sFRA |
|---|---|
| L → H | sFRA0(WL1) |
| L → H | sFRA1(WL2) |
| L → H | sFRA2(WL12) |
| L → H | sFRA3(WL13) |
| ⋮ | ⋮ |
| L | sFRAk-2 |
| L | sFRAk-1 |

MEMORY DEVICES PERFORMING SELECTIVE POST PACKAGE REPAIR, ELECTRONIC DEVICES INCLUDING THE SAME, AND OPERATING METHODS OF THE SAME

CROSS-REFERENCE TO RELATED APPLICATIONS

This application claims priority under 35 U.S.C. § 119 to Korean Patent Application No. 10-2023-0054011 filed on Apr. 25, 2023, in the Korean Intellectual Property Office, the disclosures of which are incorporated by reference herein in their entireties.

BACKGROUND

Embodiments of the present disclosure described herein relate to semiconductor devices, and more particularly, relate to memory devices, performing a post package repair, electronic devices including the memory devices, and operating methods of the memory devices.

A volatile memory device may include a plurality of regular memory cells. When the plurality of regular memory cells of the volatile memory device includes even one defective memory cell (also referred to as a fail memory cell), the volatile memory device may fail to perform a desired function correctly. In this case, the volatile memory device may be treated as a defective product. However, when the number of defects is small enough, it may not be efficient to discard the entire volatile memory device in terms of the production yield.

Accordingly, the volatile memory device may further include redundancy memory cells in addition to the regular memory cells. When the regular memory cells include defective memory cells, the volatile memory device may replace the defective memory cells with the redundancy memory cells.

The volatile memory device may perform a repair operation to replace a defective memory cell with a redundancy memory cell by rows and/or columns of the regular memory cells, including the defective memory cell. However, there may be a limitation on the space of the volatile memory device for storing a fail address corresponding to the row and/or column connected to at least one defective memory cell.

Due to the limitation on the space of the volatile memory device, the number of redundancy memory cells for replacing defective memory cells may also be limited. Accordingly, a method of selectively storing a fail address based on the number of defective memory cells connected to a word line or a bit line.

SUMMARY

Embodiments of the present disclosure provide a memory device, selectively performing a post package repair by selectively storing a fail address, an electronic device including the memory device, and an operating method of the memory device. According to some embodiments, a memory device comprising: a plurality of memory chips, wherein each of the plurality of memory chips includes: a memory cell array including a plurality of memory cells that are connected to a plurality of word lines and a plurality of bit lines; a row decoder connected to the memory cell array through the plurality of word lines; a sense amplifier and write driver connected to the memory cell array through the plurality of bit lines; and a logic circuit that is configured to read data from and/or write data to the memory cell array based on a command and an address received from a controller, wherein, in response to a post package repair (PPR) command and a target value received from the controller, each of the plurality of memory chips is configured to: perform a write operation of first write data with respect to memory cells that correspond to a row address generated in a PPR mode executed in response to the PPR command, and perform a read operation of the memory cells that correspond to the row address, resulting in first read data; generate a comparison signal based on a result of comparing the first write data and the first read data; program the row address corresponding to the comparison signal as a selected fail row address based on the target value; and write the first write data in redundancy memory cells, which are connected to a redundancy word line that is configured to replace a fail word line corresponding to the selected fail row address, from among the plurality of memory cells.

According to some embodiments, an operating method of a memory device which includes a memory chip including a plurality of memory cells, the method comprising: receiving, by the memory chip, a PPR command and a target value from a controller; entering, by the memory chip, a PPR mode in response to the PPR command; and performing, by the memory chip, a PPR operation based on the target value, wherein the performing a PPR operation includes: writing first write data in memory cells corresponding to a row address, and read the memory cells corresponding to the row address, resulting in first read data; generating a comparison signal based on a result of comparing the first write data and the first read data; programming the row address corresponding to the comparison signal as a selected fail row address based on the target value; and generating a repair signal when the selected fail row address is generated.

According to some embodiments, an operating method of a memory device which includes a memory chip including a plurality of memory cells, the method comprising: transferring a PPR command and a target value from a controller to the memory chip; and causing the memory chip to: enter a PPR mode in response to the PPR command; write first write data in memory cells corresponding to a row address, and read the memory cells corresponding to the row address, resulting in first read data; generate a comparison signal based on a result of comparing the first write data and the first read data; program the row address corresponding to the comparison signal as a selected fail row address based on the target value; and generate a repair signal when the selected fail row address is generated.

BRIEF DESCRIPTION OF THE FIGURES

The above and other objects and features of the present disclosure will become more apparent by describing in detail embodiments thereof with reference to the accompanying drawings.

FIGS. 6A and 6B are tables illustrating data included in a fail address memory (FAM) in detail according to some embodiments of the present disclosure.

DETAILED DESCRIPTION

Figure 1:
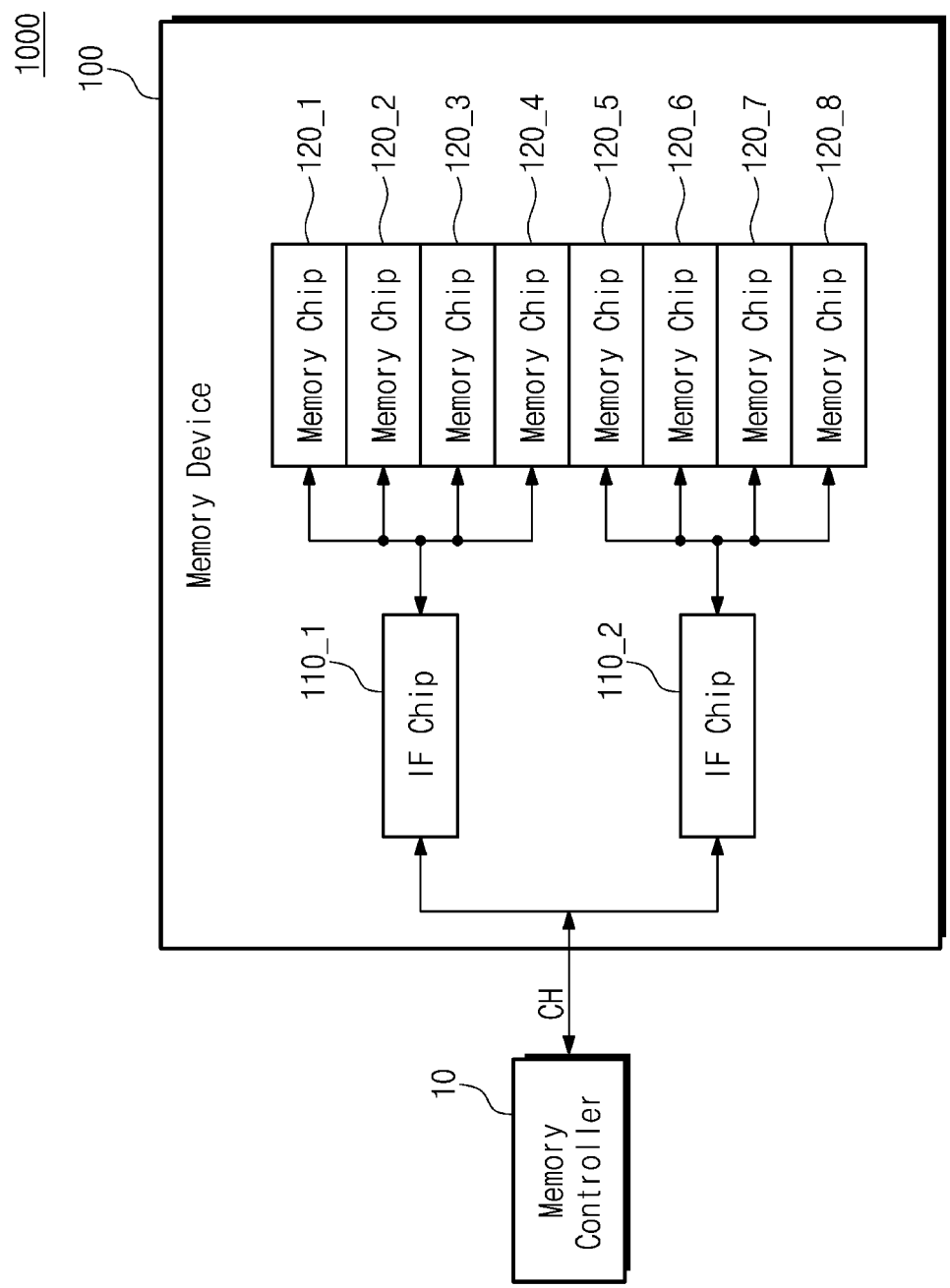
FIG. 1 is a block diagram illustrating an electronic device according to some embodiments of the present disclosure.

Below, embodiments of the present disclosure will be described in detail and clearly to such an extent that an ordinary one in the art easily carries out the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer, or section from another element, component, region, layer, or section. Thus, a first element, component, region, layer or section described under could be termed a second element, component, region, layer or section, without departing from the idea and scope of the present disclosure.

It will be understood that when an element or layer is referred to as being "connected to", or "coupled to" another element or layer, it may be directly on, connected to, or coupled to the other element or layer, or one or more intervening elements or layers may be present. In contrast, when an element is referred to as being "directly coupled," "directly connected," or "directly responsive" to, "directly on", or the like another element, there are no intervening elements present. When an element or layer is referred to as being "connected to", or "coupled to" another element or layer, it may be physically and/or electrically connected to, or couple to the other element or layer. In addition, it will also be understood that when an element or layer is referred to as being "between" two elements or layers, it may be the only element or layer between the two elements or layers, or one or more intervening elements or layers may also be present.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other and may be technically associated with each other or operate with each other. The embodiments may be implemented independently of each other and may be implemented together in an association relationship.

When a memory device operates in a normal mode, the memory device may be treated as a defective product due to even one fail cell included in the memory device.

However, when the memory device operates in a test mode (hereinafter, also referred to as a post package repair (PPR) mode executed in response to a PPR command), some fail cells may occur in the memory device depending on the test condition (hereinafter, for example, a data writing time to be described with reference to FIGS. 3A to 3C). In this case, it may be inefficient to treat the memory device including some fail cells as a defective product in terms of the production yield.

Accordingly, the memory device may include redundancy memory cells for replacing defective memory cells (also referred to as fail memory cells) and perform a repair operation such that a word line and/or a bit line connected to the fail memory cells may be replaced with redundancy word lines and/or redundancy bit lines, respectively. The post package repair (PPR) may refer to a repair operation that is performed after the memory device is packaged. As used hereinafter, the term "replaced" may refer to electrically replaced and/or functionally replaced.

The memory device may manage (e.g., designate) an address corresponding to a word line and a bit line connected to a fail memory cell as a fail row address and a fail column address, respectively. However, there may be a limitation on a space (e.g., a fail address memory (FAM)) of the memory device, which is capable of storing a fail row address and a fail column address. Also, because the memory device has a limited size, there may be a limitation on the number of redundancy word lines and redundancy bit lines on which the repair operation is capable of being performed.

Accordingly, while the memory device operates in the PPR mode in response to the PPR command, even though some fail cells (also referred to as the fail memory cells) are detected in the memory device, it may be important to find actual fail addresses on which the PPR operation is selectively performed.

For example, a fail address of an actual fail word line that needs to be replaced with a redundancy word line may be replaced with a repair address depending on the number of fail cells connected to the actual fail word line. This will be described in detail later.

Hereinafter, in the specification, there is disclosed a configuration in which an address of a word line or a bit line connected to one or more fail cells may be managed (e.g., designated) as a fail address but may be programmed as a selected fail address targeted for the PPR only when the number of the fail cells in the word line or the bit line satisfies a condition. This will be described in detail later.

FIG. 1 is a block diagram illustrating an electronic device 1000 according to some embodiments of the present disclosure. Referring to FIG. 1, the electronic device 1000 may include a memory controller 10 and a memory device 100. In some embodiments, the memory device 100 may be also referred to as a "memory package".

The memory controller 10 may control an overall operation of the memory device 100. The memory controller 10 may process a request of a host (not illustrated) placed on the outside of the memory device 100. The memory controller 10 may communicate with the memory device 100 through a channel CH. As used hereinafter, the terms "external/outside configuration", "external/outside device", "external/outside power", "external/outside signal", "external", or "outside" are intended to broadly refer to a device, circuit, block, module, power, and/or signal that resides externally (e.g., outside of a functional or physical boundary) with respect to a given circuit, block, module, system, or device.

In detail, the memory controller 10 may access (e.g., may be electrically connected to) the memory device 100 through the channel CH in compliance with the interface standard (e.g., the double data rate (DDR) synchronous dynamic random access memory (SDRAM) standard) between the memory controller 10 and memory chips 120_1 to 120_8. The number of channels (e.g., the channel CH) between the memory controller 10 and the memory device 100 may be one or more than one.

The number of memory devices (e.g., the memory device 100) per channel (e.g., the channel CH) may be one or more than one. However, the present disclosure is not limited to the number of channels and the number of memory devices, which are illustrated in FIG. 1.

The memory device 100 may be a dynamic random access memory (DRAM), but the present disclosure is not limited thereto. The memory device 100 may be, for example, a random access memory such as a static random access memory (SRAM), a magnetic random access memory (MRAM), a phase-change random access memory (PRAM), a ferroelectric random access memory (FRAM), and a resistive random access memory (RRAM).

The memory device 100 may include interface chips 110_1 and 110_2 and the memory chips 120_1 to 120_8. The interface chips 110_1 and 110_2 may be used to connect (e.g., electrically connect) the memory controller 10 and the memory chips 120_1 to 120_8.

The memory chips 120_1 to 120_8 may store the program data (or write data) transmitted through the interface chips 110_1 and 110_2, based on a control signal(s) of the memory controller 10 transmitted through the interface chips 110_1 and 110_2.

The memory chips 120_1 to 120_8 may transmit the read data to the memory controller 10 through the interface chips 110_1 and 110_2, based on a control signal(s) of the memory controller 10 transmitted through the interface chips 110_1 and 110_2.

The memory controller 10 may select and access one target memory chip among the memory chips 120_1 to 120_8 per (e.g., through) one channel CH. In this case, the memory controller 10 may select one of the 8 memory chips 120_1 to 120_8 through the interface chips 110_1 and 110_2. Each of the interface chips 110_1 and 110_2 and the memory chips 120_1 to 120_8 may be referred to as a "semiconductor chip".

For example, the memory controller 10 may select the interface chip 110_1. In this case, the memory controller 10 may select the target memory chip among the four memory chips 120_1 to 120_4.

For example, the memory controller 10 may select the interface chip 110_2. In this case, the memory controller 10 may select the target memory chip among the four memory chips 120_5 to 120_8.

The memory controller 10 may select one of the memory chips 120_1 to 120_8 as the target memory chip and may control the PPR operation of the target memory chip based on a command and an address transmitted through the channel CH connected to the interface chips 110_1 and 110_2. This will be described in detail later.

In some embodiments, the number of interface chips connected to one channel CH and the number of memory chips connected to one interface chip are not limited to the example illustrated in FIG. 1. Also, an example in which semiconductor chips are connected to each other in a tree structure is illustrated in FIG. 1, but the way to connect semiconductor chips is not limited to the example illustrated in FIG. 1. For example, semiconductor chips may be connected to each other based on any other structures (e.g., a daisy chain structure and a hierarchy structure).

Figure 2:
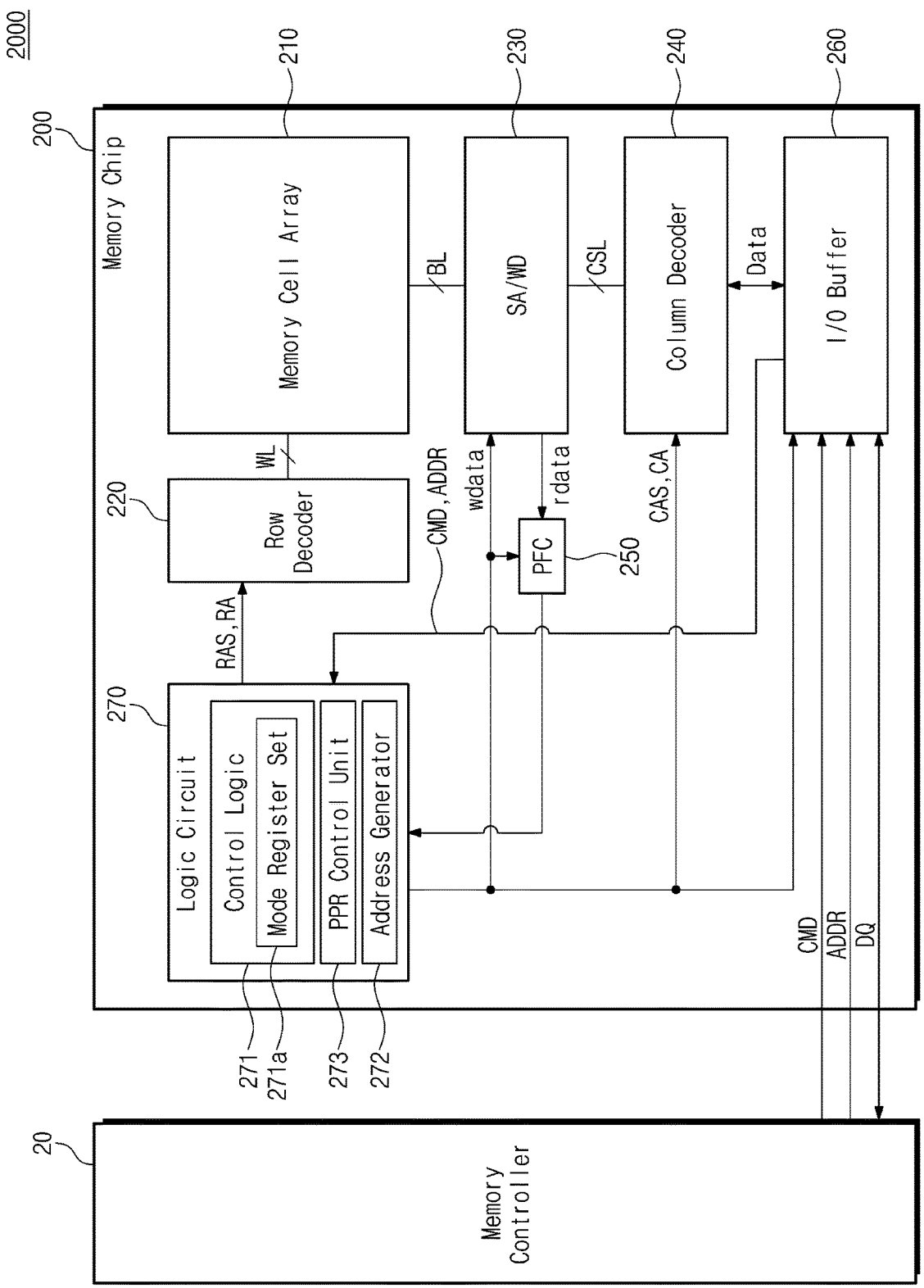
FIG. 2 is a diagram illustrating a memory chip included in an electronic device in detail, according to some embodiments of the present disclosure.

FIG. 2 is a diagram illustrating a memory chip included in an electric device in detail, according to some embodiments of the present disclosure. Referring to FIG. 2, an electronic device 2000 may include a memory controller 20 and a memory chip 200. The memory chip 200 of FIG. 2 may correspond to one of the memory chips 120_1 to 120_8 of FIG. 1.

The memory controller 20 may transmit a command CMD and an address ADDR to the memory chip 200 in response to the request of the external host (not illustrated). The memory controller 20 may exchange a data signal DQ with the memory chip 200.

For example, the memory controller 20 may transmit a write command (e.g., the command CMD), an address (e.g., the address ADDR), and the data signal DQ to the memory chip 200. The memory chip 200 may record data at memory cells corresponding to the address in response to the write command.

For example, the memory controller 20 may transmit a read command (e.g., the command CMD) and an address (e.g., the address ADDR) to the memory chip 200. In response to the read command, the memory chip 200 may transmit data read from memory cells corresponding to the address to the memory controller 20 as the data signal DQ.

The memory chip 200 may include a memory cell array 210, a row decoder 220, a sense amplifier and write driver (SA/WD) 230, a column decoder 240, a pass/fail check circuit (PFC) 250, an input/output buffer 260, and a logic circuit 270.

The memory cell array 210 may include a plurality of memory cells (refer to FIG. 3) arranged in a row direction and a column direction. Each of the plurality of memory cells may be connected to one word line among a plurality of word lines WL and one bit line among a plurality of bit lines BL. The plurality of word lines WL may extend in the row direction, and the plurality of bit lines BL may extend in the column direction.

In the memory chip 200, each of the plurality of memory cells (refer to FIG. 3) may be a single level cell (SLC) storing one bit. This will be described in detail with reference to FIG. 3.

The row decoder 220 may select one of the plurality of word lines WL connected to the memory cell array 210. For example, the row decoder 220 may receive a row address RA from the input/output buffer 260 through the logic circuit 270. In some embodiments, in the PPR mode that is executed in response to the PPR command, the row decoder 220 may receive the row address RA from an address generator 272 to be described later.

The row decoder 220 may select one word line corresponding to the row address RA from among the plurality of word lines WL. The row decoder 220 may activate the selected word line in response to a row address control signal RAS. The row address control signal RAS may be received from the memory controller 20.

The sense amplifier and write driver 230 may be connected to the plurality of bit lines BL connected to the memory cell array 210. The sense amplifier and write driver 230 may perform the write operation or the read operation in response to a control signal (not illustrated) of the logic circuit 270.

The control signal (not illustrated) may include various kinds of pulse signals such as a write pulse and a read pulse. In response to various kinds of pulse signals, the sense amplifier and write driver 230 may provide a write current (or a write voltage) (not illustrated) or a read current (or a read voltage) (not illustrated) to the memory cell array 210.

The column decoder 240 may be connected to the sense amplifier and write driver 230 through a plurality of column selection lines CSL. The column decoder 240 may select one of the plurality of bit lines BL connected to the memory cell array 210. For example, the column decoder 240 may receive a column address CA from the input/output buffer 260 through the logic circuit 270. In some embodiments, in the PPR mode that is executed in response to the PPR command, the column decoder 240 may receive the column address CA from the address generator 272 to be described later.

The column decoder 240 may select one bit line corresponding to the column address CA from among the plurality of bit lines BL. The column decoder 240 may activate the selected bit line in response to a column address control signal CAS. The column address control signal CAS may be received from the memory controller 20.

The pass/fail check circuit 250 may be connected to the sense amplifier and write driver 230. The pass/fail check circuit 250 may compare read data rdata read from the memory cell array 210 and write data wdata to be written in the memory cell array 210 in response to a control signal (not illustrated) of the logic circuit 270. The pass/fail check circuit 250 may internally store the write data wdata.

The write data wdata may include data bits of a specific pattern, which are stored in the memory chip 200. Logical values of the data bits of the read data rdata and logical values of the data bits of the write data wdata may be at least partially different.

The pass/fail check circuit 250 may provide a comparison result of the write data wdata and the read data rdata to the logic circuit 270. This will be described in detail later.

The input/output buffer 260 may receive the command CMD and the address ADDR from the memory controller 20. The input/output buffer 260 may output data "data" to the memory controller 20 as the data signal DQ, based on the voltage output from the sense amplifier and write driver 230.

The logic circuit 270 may include control logic 271, the address generator 272, and a PPR control unit 273. The control logic 271 may control the components of the memory chip 200.

The control logic 271 may control the row decoder 220 based on (e.g., through) the row address control signal RAS. The control logic 271 may control the column decoder 240 based on (e.g., through) the column address control signal CAS.

The control logic 271 may control the comparison operation of the write data wdata and the read data rdata of the sense amplifier and write driver 230 based on (e.g., through) a control signal (not illustrated). This will be described in detail later. The control logic 271 may control the input/output buffer 260 based on (e.g., through) a control signal (not illustrated).

The control logic 271 may include a mode register set 271a. Information about an operating mode corresponding to the command received from the memory controller 20 depending on the request of the external host (not illustrated) may be stored in the mode register set 271a. The operating mode may be, for example, a read mode, a write mode, a precharge mode, and an activation mode.

In some embodiments, information about the PPR mode corresponding to the PPR command received from the memory controller 20 depending on the request of the external host (not illustrated) may be stored in the mode register set 271a. The PPR mode will be described in detail later.

In the PPR mode that is executed in response to the PPR command, the address generator 272 may generate a row address or a column address. The address generator 272 may transmit the generated row address to the row decoder 220. The address generator 272 may transmit the generated column address to the column decoder 240. The row address and/or the column address generated by the address generator 272 may be different from the address ADDR received from the memory controller 20.

The PPR control unit 273 may perform the PPR operation with respect to the row address or the column address received from the address generator 272. The PPR control unit 273 may perform the PPR operation based on the comparison result of the pass/fail check circuit 250.

That is, the PPR control unit 273 may perform the PPR operation with regard to the row address RA or the column address CA in response to the PPR command. This will be described in detail later.

Figure 3A:
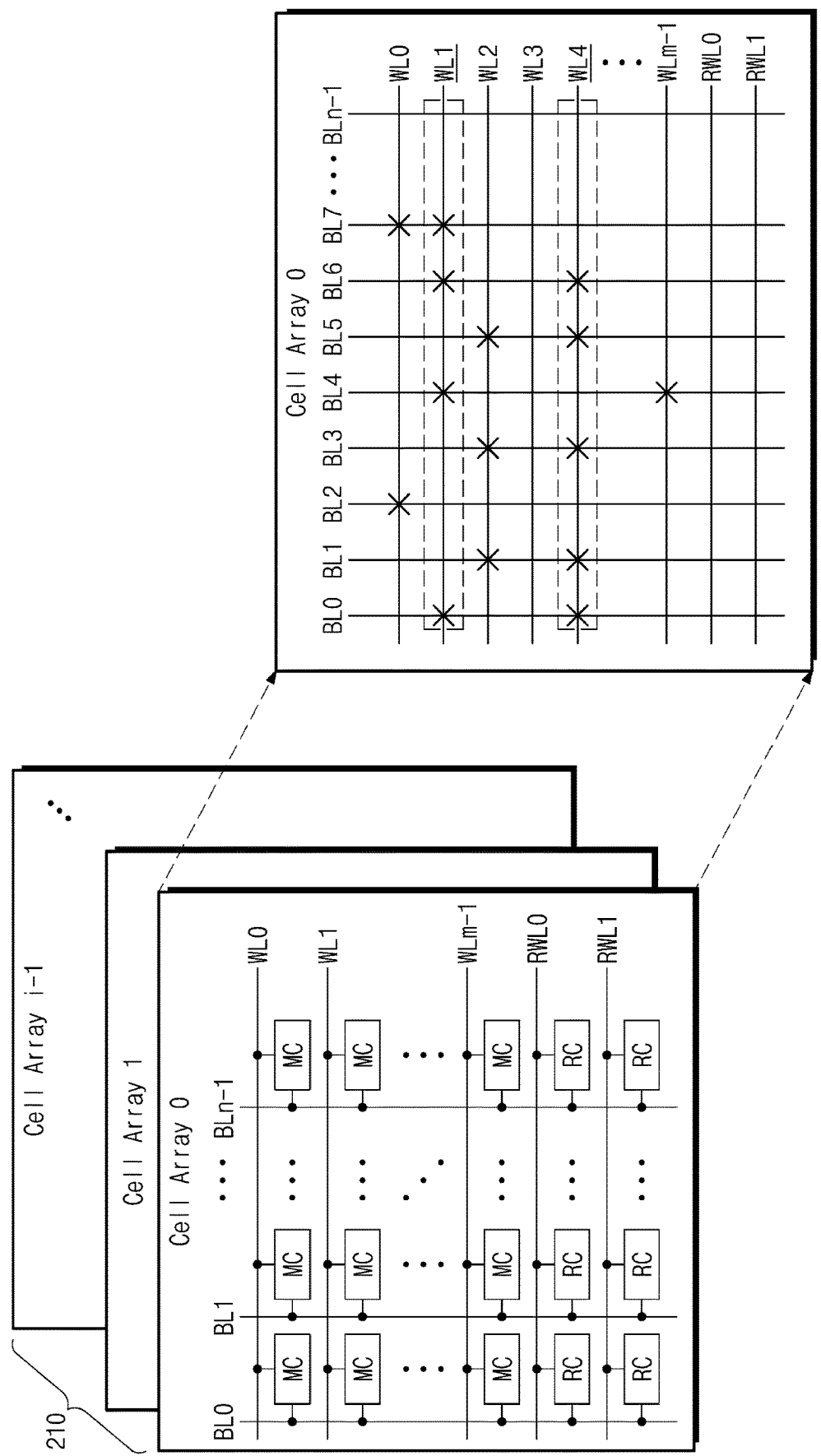
FIGS. 3A to 3C are diagrams illustrating a memory cell array including fail cells.
Figure 3B:
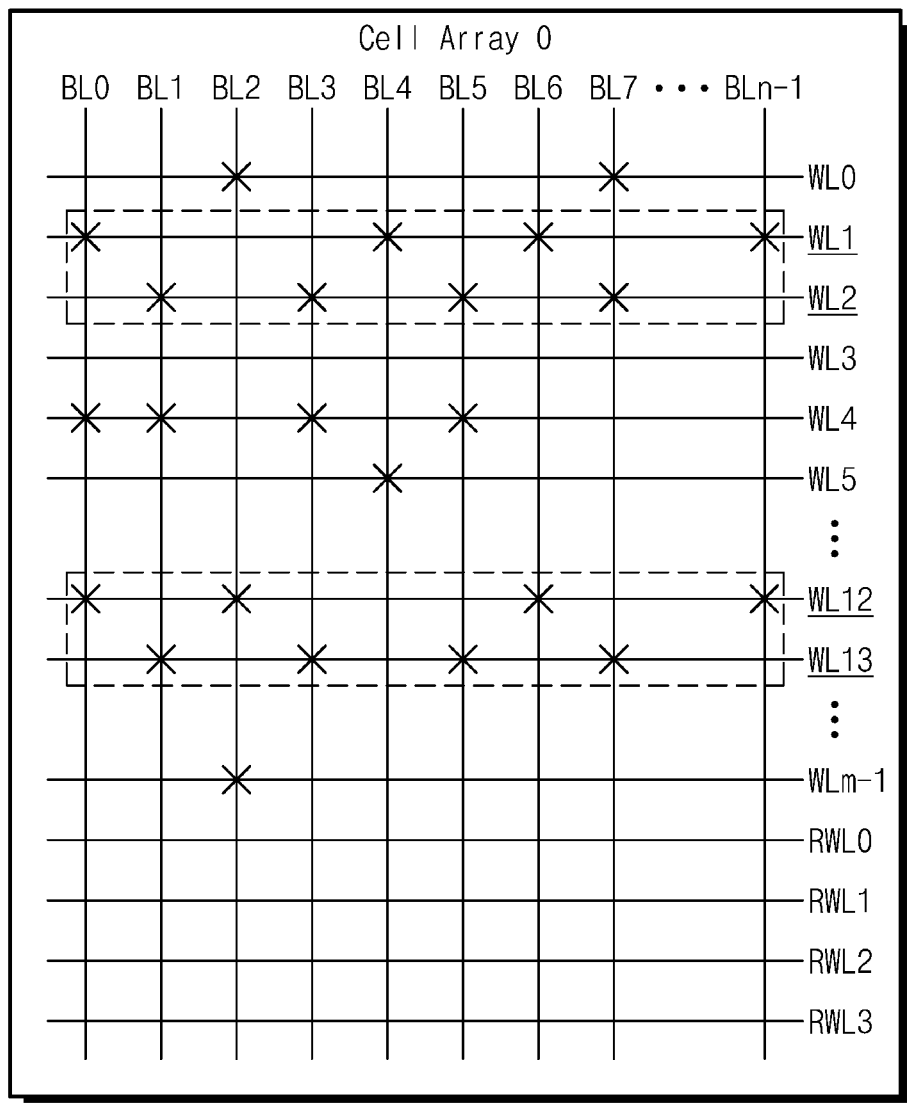
Figure 3C:
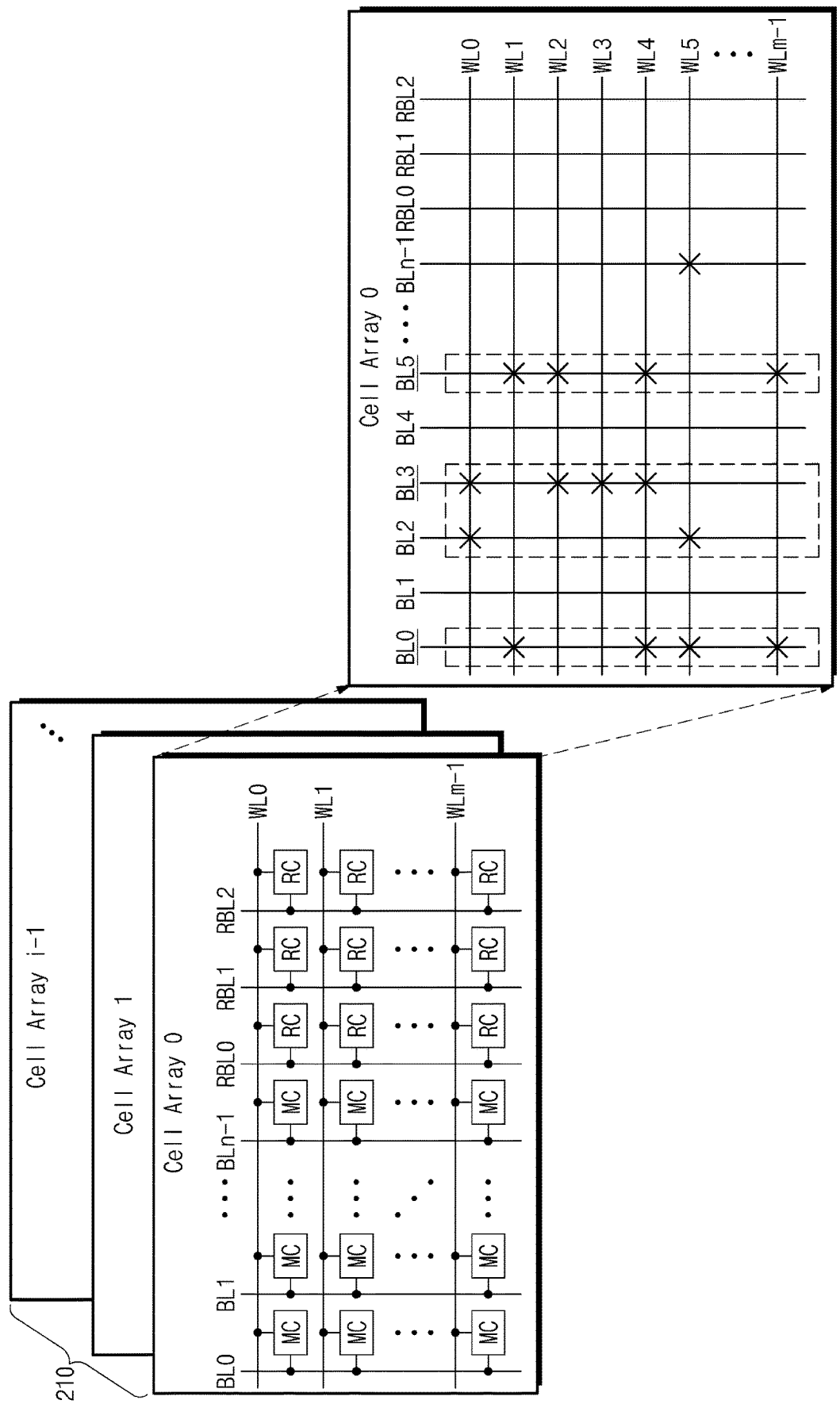

FIGS. 3A to 3C are diagrams illustrating a memory cell array including fail cells. For brevity of description, in FIGS. 3A to 3C, there are omitted the remaining components other than the memory cell array 210 that includes a plurality of regular memory cells MC connected to the first to m-th word lines WL0 to WLm−1 (m being a positive integer) and the first to n-th bit lines BL0 to BLn−1 (n being a positive integer) (n being smaller than m, equal to m, or greater than m).

Referring to FIGS. 2 to 3C, the memory cell array 210 may include a plurality of cell arrays Cell Array 0 to Cell Array i−1. Below, only the first cell array Cell Array 0 will be described in FIGS. 3A to 3C. The second to i-th cell arrays Cell Array 1 to Cell Array i−1 may have the same configuration as the first cell array Cell Array 0.

FIGS. 3A to 3C show connection relationships of the plurality of regular memory cells MC and a plurality of redundancy memory cells RC of the first cell array Cell Array 0 and show fail memory cells "X" of the first cell array Cell Array 0.

In FIGS. 3A and 3B, the first cell array Cell Array 0 may further include the plurality of redundancy memory cells RC connected to one or more redundancy word lines (e.g., a first and second redundancy word lines RWL0 and RWL1 in FIG. 3A) and the first to n-th bit lines BL0 to BLn−1 in addition to the plurality of regular memory cells connected to the first to m-th word lines WL0 to WLm−1 and the first to n-th bit lines BL0 to BLn−1. The number of redundancy word lines is not limited to the examples illustrated in FIGS. 3A and 3B.

The regular memory cells MC and the redundancy memory cells RC may share the first to n-th bit lines BL0 to BLn−1 and may be accessed by using the same column addresses.

In some embodiments (e.g., in FIG. 3A), two cells among the regular memory cells connected to the first word line WL0 and the first to n-th bit lines BL0 to BLn−1 may be fail cells. Four cells among the regular memory cells connected to the second word line WL1 and the first to n-th bit lines BL0 to BLn−1 may be fail cells.

In some embodiments (e.g., in FIG. 3A), three cells among the regular memory cells connected to the third word line WL2 and the first to n-th bit lines BL0 to BLn−1 may be fail cells. All the regular memory cells connected to the fourth word line WL3 and the first to n-th bit lines BL0 to BLn−1 may be normal.

In some embodiments (e.g., in FIG. 3A), five cells among the regular memory cells connected to the fifth word line WL4 and the first to n-th bit lines BL0 to BLn−1 may be fail cells. Likewise, one cell among the regular memory cells connected to the m-th word line WLm−1 and the first to n-th bit lines BL0 to BLn−1 may be a fail cell.

However, in the first cell array Cell Array 0, the number of fail cells among the regular memory cells connected to each word line is not limited thereto.

For example, the number of fail cells may change depending on a time during which data are written in the memory cell array 210. As the time during which data are written in the memory cell array 210 decreases, the accuracy of writing data may decrease; in this case, the number of fail cells may increase. In contrast, as the time during which data are written in the memory cell array 210 is sufficiently secured (e.g., increased), the accuracy of writing data may increase; in this case, the number of fail cells may decrease.

FIG. 3A shows an embodiment of a first PPR mode executed in response to the PPR command. The first PPR mode may refer to a mode of replacing one word line, corresponding to a same address (e.g., a same row address), with one redundancy word line based on the number of target fail cells (hereinafter referred to as "target data") and the number of fail cells that are connected to the one word line.

For example, when a value of the target data (e.g., referring to a target data TD in FIG. 4) is "4", the second word line WL1 and the fifth word line WL4 may be respectively replaced with a first redundancy word line RWL0 and a second redundancy word line RWL1. This will be described in detail later. The value of the target data (the value of the number of target fail cells) may be hereinafter referred to as a "target value".

In some embodiments (e.g., in FIG. 3B), two cells among the regular memory cells connected to the first word line WL0 and the first to n-th bit lines BL0 to BLn−1 may be fail cells.

In some embodiments (e.g., in FIG. 3B), four cells among the regular memory cells connected to the second word line WL1 and the first to n-th bit lines BL0 to BLn−1 may be fail cells. Four cells among the regular memory cells connected to the third word line WL2 and the first to n-th bit lines BL0 to BLn−1 may be fail cells.

In some embodiments (e.g., in FIG. 3B), all the regular memory cells connected to the fourth word line WL3 and the first to n-th bit lines BL0 to BLn−1 may be normal.

In some embodiments (e.g., in FIG. 3B), four cells among the regular memory cells connected to the fifth word line WL4 and the first to n-th bit lines BL0 to BLn−1 may be fail cells. One cell among the regular memory cells connected to the sixth word line WL5 and the first to n-th bit lines BL0 to BLn−1 may be a fail cell.

In some embodiments (e.g., in FIG. 3B), four cells among the regular memory cells connected to the 13th word line WL12 and the first to n-th bit lines BL0 to BLn−1 may be fail cells. Four cells among the regular memory cells connected to the 14th word line WL13 and the first to n-th bit lines BL0 to BLn−1 may be fail cells.

In some embodiments (e.g., in FIG. 3B), one cell among the regular memory cells connected to the m-th word line WLm−1 and the first to n-th bit lines BL0 to BLn−1 may be a fail cell. However, in the first cell array Cell Array 0, the number of fail cells among the regular memory cells connected to each word line is not limited thereto.

FIG. 3B shows an embodiment of a second PPR mode executed in response to the PPR command. The second PPR mode may refer to a mode of replacing successive word lines with redundancy word lines based on the target data and the number of fail cells connected to a word line (e.g., each of the successive word lines) corresponding to each of successive addresses.

For example, when a value of the target data is "4", the second word line WL1 and the third word line WL2 that are word lines respectively corresponding to successive addresses may be respectively replaced with the first redundancy word line RWL0 and the second redundancy word line RWL1.

Unlike the description given with reference to FIG. 3A, for example, because four fail cells are connected to the fifth word line WLA but one fail cell is connected to the sixth word line WL5, the fifth word line WL4 may not be replaced with a redundancy word line.

In FIG. 3B, for example, the 13th word line WL12 and the 14th word line WL13 that are word lines respectively corresponding to successive addresses may be respectively replaced with a third redundancy word line RWL2 and a fourth redundancy word line RWL3. This will be described in detail later.

FIG. 3C shows an embodiment of the memory cell array 210 where one bit line is replaced with one redundancy bit line based on the target data and the number of fail cells connected to one bit line corresponding to the same address. In FIG. 3C, the description that is the same as the description given with reference to FIGS. 3A and 3B may be omitted.

In FIG. 3C, the first cell array Cell Array 0 may further include the plurality of redundancy memory cells RC connected to three redundancy bit lines RBL0 to RBL2 and the first to m-th word lines WL0 to WLm−1 in addition to the plurality of regular memory cells MC connected to the first to m-th word lines WL0 to WLm−1 and the first to n-th bit lines BL0 to BLn−1. The number of redundancy bit lines is not limited to the example illustrated in FIG. 3C.

The regular memory cells MC and the redundancy memory cells RC may share the first to m-th word lines WL0 to WLm−1 and may be accessed by using the same row addresses.

In some embodiments (e.g., in FIG. 3C), four cells among the regular memory cells connected to the first bit line BL0 and the first to m-th word lines WL0 to WLm−1 may be fail cells. All the regular memory cells connected to the second bit line BL1 and the first to m-th word lines WL0 to WLm−1 may be normal.

In some embodiments (e.g., in FIG. 3C), two cells among the regular memory cells connected to the third bit line BL2 and the first to m-th word lines WL0 to WLm−1 may be fail cells. Four cells among the regular memory cells connected to the fourth bit line BL3 and the first to m-th word lines WL0 to WLm−1 may be fail cells.

In some embodiments (e.g., in FIG. 3C), all the regular memory cells connected to the fifth bit line BL4 and the first to m-th word lines WL1 to WLm−1 may be normal. Four cells among the regular memory cells connected to the sixth bit line BL5 and the first to m-th word lines WL0 to WLm−1 may be fail cells.

In some embodiments (e.g., in FIG. 3C), one cell among the regular memory cells connected to the n-th bit line BLn−1 and the first to m-th word lines WL0 to WLm−1 may be a fail cell. However, in the first cell array Cell Array 0, the number of fail cells among the regular memory cells connected to each bit line is not limited thereto.

For example, when a value of the target data is "4", the first bit line BL0, the fourth bit line BL3, and the sixth bit line BL5 may be respectively replaced with the first redundancy bit line RBL0, the second redundancy bit line RBL1, and the third redundancy bit line RBL2.

Below, a configuration in which the memory chip 200 operates in the first or second PPR mode in response to the PPR command depending on the number of fail memory cells connected to the same word line or the number of fail memory cells connected to each of successive word lines will be described with reference to FIGS. 4 to 7B.

Figure 4:
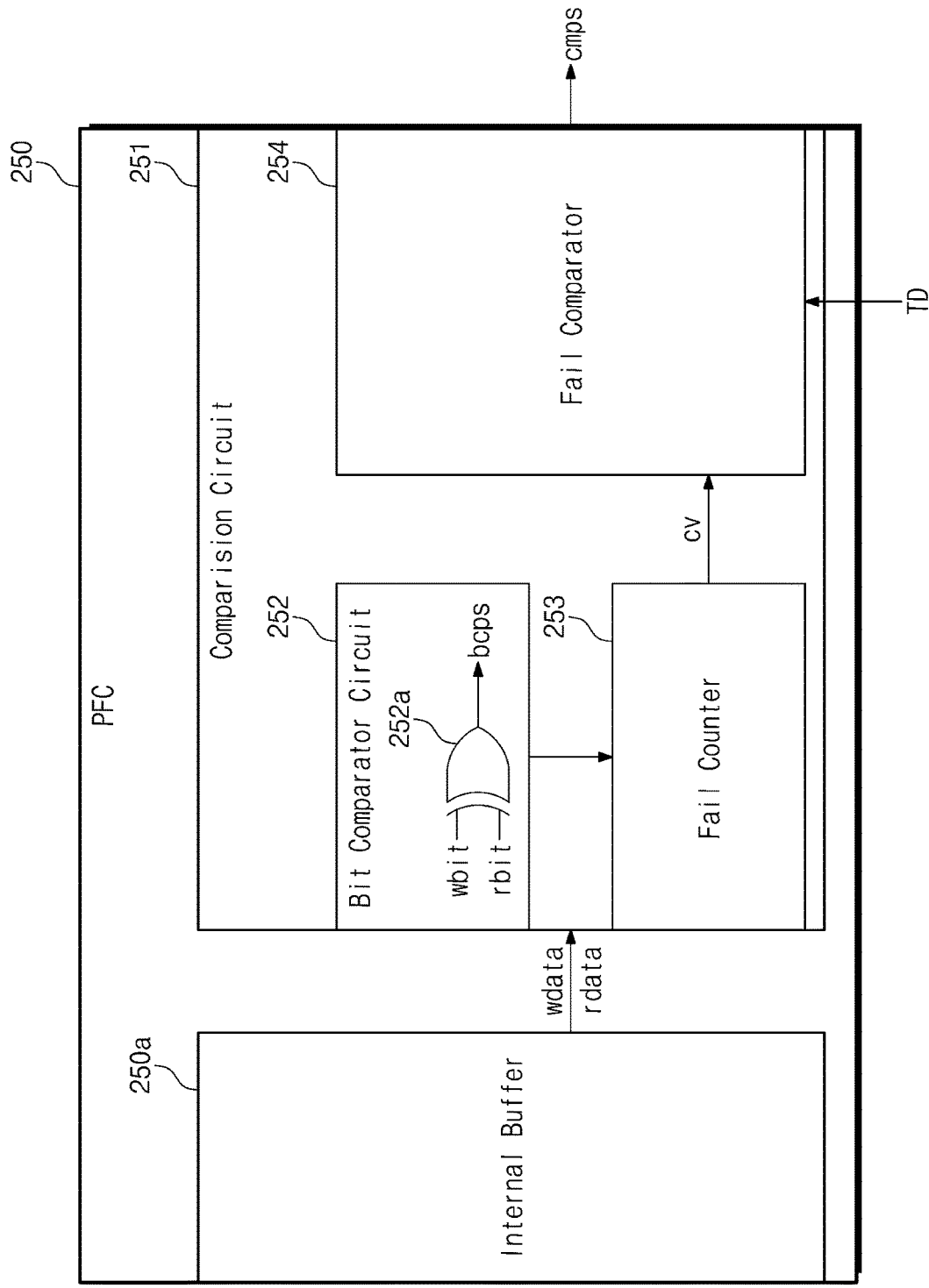
FIG. 4 is a block diagram illustrating a pass/fail check circuit in detail according to some embodiments of the present disclosure.

FIG. 4 is a block diagram illustrating a pass/fail check circuit (e.g., the pass/fail check circuit 250 in FIG. 2) in detail. Referring to FIGS. 2 to 4, the pass/fail check circuit 250 may include an internal buffer 250a and a comparison circuit 251.

The internal buffer 250a may store the write data wdata to be written in the memory cell array 210 and the read data rdata read from the memory cell array 210. The internal buffer 250a may provide the comparison circuit 251 with the write data wdata and the read data rdata under control of the logic circuit 270.

The comparison circuit 251 may include a bit comparator circuit 252, a fail counter 253, and a fail comparator 254. The comparison circuit 251 may compare logical values of each of corresponding bit pairs of the write data wdata and the read data rdata.

For example, write bits wbit of the write data wdata and/or read bits rbit of the read data rdata may comprise data of memory cells connected to one word line.

The bit comparator circuit 252 may include an exclusive OR gate 252a. The bit comparator circuit 252 may compare logical values of each of corresponding bit pairs of the write bits wbit of the write data wdata and the read bits rbit of the read data rdata and may output a bit comparison signal bcps to the fail counter 253. The bit comparison signal bcps may include a plurality of comparison bits respectively including bit pair comparison results.

For example, each of the plurality of comparison bits included in the bit comparison signal bcps may have a first logical value of "0" or a second logical value of "1" depending on whether the logical values of the corresponding bit pair (e.g., the write bit wbit and the read bit rbit) coincide with each other. When the logical values of the corresponding bit pair coincide with each other, the comparison bit may have the first logical value of "0". When the logical values of the corresponding bit pair do not coincide with each other, the comparison bit may have the second logical value of "1".

The fail counter 253 may receive the bit comparison signal bcps from the bit comparator circuit 252. The fail counter 253 may count the number of comparison bits each having the second logical value of "1" (hereinafter referred to as "fail bits") from among the plurality of comparison bits included in the bit comparison signal bcps. The fail counter 253 may count the number of fail bits with respect to bit pairs of memory cells connected to one word line. The fail counter 253 may output a count value to the fail comparator 254.

The fail comparator 254 may receive the count value from the fail counter 253. The fail comparator 254 may compare the count value with target data TD. The target data TD may include information about the number of target fail cells.

When the count value is equal to the number of target fail cells (the target data TD) or when the count value is greater than the number of target fail cells (the target data TD), the fail comparator 254 may generate a comparison signal cmps. The fail comparator 254 may output the comparison signal cmps to the PPR control unit 273 (refer to FIG. 5).

Figure 5:
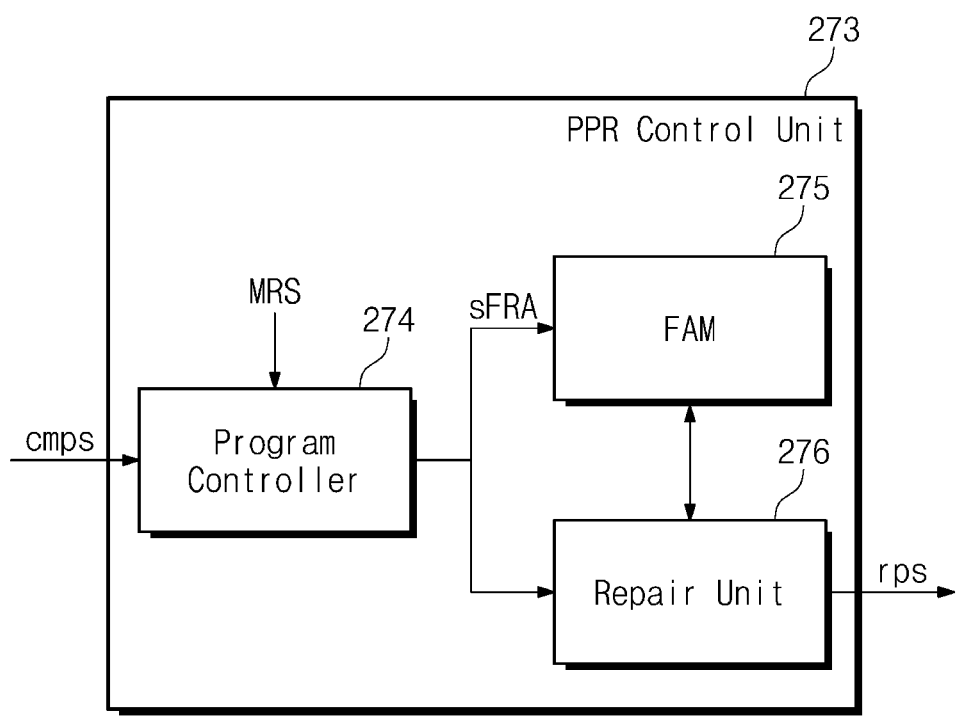
FIG. 5 is a block diagram illustrating a post package repair (PPR) control unit in detail according to some embodiments of the present disclosure.

FIG. 5 is a block diagram illustrating a post package repair (PPR) control unit in detail. Referring to FIGS. 2 to 5, the PPR control unit 273 may include a program controller 274, a fail address memory (FAM) 275, and a repair unit 276.

The program controller 274 may receive the comparison signal cmps from the pass/fail check circuit 250. When the PPR command is received, the program controller 274 may operate in the first PPR mode or the second PPR mode depending on data MRS stored in the mode register set 271a.

In the first PPR mode that is executed in response to the PPR command, when the program controller 274 receives one comparison signal cmps from the pass/fail check circuit 250, the program controller 274 may program a row address indicating memory cells, in which data bits experiencing the comparison operation are stored, in the fail address memory 275 as a selected fail row address sFRA. The row address may be received from the address generator 272.

In the first PPR mode that is executed in response to the PPR command, only the row address corresponding to the comparison signal cmps may be programmed in the fail address memory (FAM) 275 as the selected fail row address sFRA. That is, in the first PPR mode, the selected fail row address sFRA may be programmed in the fail address memory 275 one by one.

In the second PPR mode that is executed in response to the PPR command, when one comparison signal cmps (e.g., a first comparison signal cmps) is received from the pass/fail check circuit 250, the program controller 274 may temporarily store the received comparison signal cmps (e.g., the first comparison signal cmps).

In some embodiment, in the second PPR mode, a next comparison signal cmps (e.g., a second comparison signal cmps) may be output based on data bits of memory cells indicated by a row address (e.g., a second row address) successive (e.g., adjacent) to the row address (e.g., a first row address) corresponding to the previously output comparison signal cmps (e.g., the first comparison signal cmps). In this case, the program controller 274 may program row addresses (e.g., the first and second row addresses), which respectively correspond to the previously output comparison signal cmps (e.g., the first comparison signal cmps) and the next comparison signal cmps (e.g., the second comparison signal cmps), as the selected fail row addresses sFRA. That is, in the second PPR mode that is executed in response to the PPR command, the selected fail row addresses sFRA may be programmed in the fail address memory 275 two by two. Successive row addresses (e.g., the first and second row addresses) may be received from the address generator 272.

In some embodiments, in the second PPR mode, there may not be output the comparison signal cmps (e.g., the second comparison signal cmps) associated with the data bits of the memory cells indicated by the row address (e.g., the second row address) successive (e.g., adjacent) to the row address (e.g., the first row address) corresponding to the previously received comparison signal cmps (e.g., the first comparison signal comps). In this case, the program controller 274 may not program the row address corresponding to the previously output comparison signal cmps (e.g., the first comparison signal comps) in the fail address memory 275. Data associated with the previous comparison signal cmps (e.g., the first comparison signal comps) may be deleted from the program controller 274.

For example, in the first cell array Cell Array 0 of FIG. 3B, the number of fail memory cells connected to the fifth word line WL4 may be "4" as described above. Accordingly, in the second PPR mode, there may be output the comparison signal cmps associated with data bits of memory cells that the row address of the fifth word line WLA indicates in the case where a value of the target data (e.g., the target data TD) is "4".

However, because the number of fail memory cells connected to the sixth word line WL5 successive (e.g., adjacent) to the fifth word line WL4 is "1", (in the case where a value of the target data (e.g., the target data TD) is "4"), in the second PPR mode, the program controller 274 may not program the row address of the fifth word line WL4 corresponding to the output comparison signal cmps in the fail address memory 275.

In the first PPR mode that is executed in response to the PPR command, when the selected fail row address sFRA is programmed in the fail address memory 275, the repair unit 276 may generate a repair signal rps (or a repair address). The fail address memory 275 may provide the selected fail row address sFRA to the repair unit 276.

In the second PPR mode that is executed in response to the PPR command, when the selected fail row addresses sFRA are programmed in the fail address memory 275, the repair unit 276 may generate the repair signal rps (or a repair address). The repair address may be programmed in the fail address memory 275. This will be described in detail with reference to FIGS. 6A and 6B. The repair unit 276 may output the repair signal rps to an anti-fuse array (refer to FIGS. 7A and 7B).

FIGS. 6A and 6B are tables illustrating data included in a fail address memory (FAM) (e.g., referring to the fail address memory 275) in detail according to some embodiments of the present disclosure. In some embodiments, the tables of FIGS. 6A and 6B may include information about "k" selected fail row addresses sFRA. That is, the number of redundancy word lines (e.g., the first and second redundancy word lines RWL0 and RWL1 in FIG. 3A) available in the PPR operation may be "k" (k being a positive integer) (k being smaller than or equal to m).

In some embodiments, the table of FIG. 6A shows the correspondence relationship between the selected fail row address sFRA and a flag bit FG when a memory chip operates in the first PPR mode in response to the PPR command. The table of FIG. 6B shows the correspondence relationship between the selected fail row address sFRA and a flag bit FG when the memory chip operates in the second PPR mode in response to the PPR command.

The flag bit FG may be data for indicating availability of redundancy pages of a redundancy cell array (refer to FIGS. 7A and 7B) included in a memory cell array. The flag bits FG stored in the tables of FIGS. 6A and 6B may have the low level as an initial value. When the flag bit FG changes from the low level to the high level, the flag bit FG may indicate that a selected fail row address (e.g., the selected fail row address sFRA) corresponding to the changed flag bit FG is replaced with a repair address.

Referring to FIGS. 2 to 6B, when the selected fail row address sFRA is programmed in the table included in the fail address memory 275, the repair unit 276 may change a logic level of the flag bit FG of a word line corresponding to the selected fail row address sFRA from the low level to the high level. When the flag bit FG changes from the low level to the high level, the word line of the selected fail row address sFRA corresponding to the flag bit FG of the high level may be replaced with the redundancy word line. This will be described in detail with reference to FIGS. 7A and 7B.

FIG. 6A will be described with reference to the first cell array Cell Array 0 of FIG. 3A. It is assumed that a value of the target data (e.g., the number of target fail cells) is "4".

When the comparison signal cmps associated with the second word line WL1 is output from the pass/fail check circuit 250, the row address of the second word line WL1 may be programmed in the fail address memory 275 as a first selected fail row address sFRA0.

The repair unit 276 may change a logic level of the flag bit FG of the second word line WL1 corresponding to the first selected fail row address sFRA0 from the low level to the high level and may replace the second word line WL1 with the redundancy word line (e.g., the first redundancy word line RWL0 in FIG. 3A).

When the comparison signal cmps associated with the fifth word line WL4 is output from the pass/fail check circuit 250, the row address of the fifth word line WL4 may be programmed in the fail address memory 275 as a second selected fail row address sFRA1.

The repair unit 276 may change a logic level of the flag bit FG of the fifth word line WL4 corresponding to the second selected fail row address sFRA1 from the low level to the high level and may replace the fifth word line WL4 with the redundancy word line (e.g., the second redundancy word line RWL1 in FIG. 3A).

The flag bit FG corresponding to each of the third to k-th selected fail row addresses sFRA2 to sFRAk-1 may remain at the low level.

FIG. 6B will be described with reference to the first cell array Cell array 0 of FIG. 3B. As described with reference to FIG. 6A, it is assumed that a value of the target data (e.g., the number of target fail cells) is "4".

When the comparison signals cmps associated with the second and third word lines WL1 and WL2 are output from the pass/fail check circuit 250, the row address of the second word line WL1 and the row address of the third word line WL2 may be programmed in the fail address memory 275 as the first selected fail row address sFRA0 and the second selected fail row address sFRA1.

First, the program controller 274 may program the first selected fail row address sFRA0 in the table of the fail address memory 275. Afterwards, the program controller 274 may program the second selected fail row address sFRA1 in the table of the fail address memory 275.

In this case, the repair unit 276 may change a logic level of the flag bit FG of each of the second and third word lines WL1 and WL2 respectively corresponding to the first and second selected fail row addresses sFRA0 and sFRA1 from the low level to the high level and may replace each of the second and third word lines WL1 and WL2 with the redundancy word line (e.g., the second and third word lines WL1 and WL2 may be replaced with the first and second redundancy word lines RWL0 and RWL1 in FIG. 3B, respectively).

In FIG. 6B, the row address corresponding to the fifth word line WL4 may be programmed in the table of the fail address memory 275 as the third selected fail row address sFRA2.

Before the fifth word line WL4 is programmed in the table of the fail address memory 275 as the third selected fail row address sFRA2, the comparison signal cmps associated with data bits of memory cells associated with the fifth word line WL4 may be output to the program controller 274. In this case, the program controller 274 may temporarily store information about the comparison signal cmps.

Because the comparison signal cmps associated with data bits of memory cells associated with the sixth word line WL5 is not output, the program controller 274 may not program the row address of the sixth word line WL5 in the table of the fail address memory 275.

Because the row address of the sixth word line WL5 successive (e.g., adjacent) to the fifth word line WL4 is not programmed in the table of the fail address memory 275, data corresponding to the third selected fail row address sFRA2 (e.g., the row address of the fifth word line WL4) may be replaced (e.g., deleted). Accordingly, a row address of another word line (e.g., 13th word line WL12), which satisfies the target data may be programmed in the table as the third selected fail row address sFRA2.

Likewise, when the comparison signals cmps associated with the 13th and 14th word lines WL12 and WL13 are output from the pass/fail check circuit 250, the row address of the 13th word line WL12 and the row address of the 14th word line WL13 may be programmed in the fail address memory 275 as the third selected fail row address sFRA2 and the fourth selected fail row address sFRA3, respectively.

In this case, the program controller 274 may first program the third selected fail row address sFRA2 in the table of the fail address memory 275. Afterwards, the program controller 274 may program the fourth selected fail row address sFRA3 in the table of the fail address memory 275.

The repair unit 276 may change a logic level of the flag bit FG of each of the 13th and 14th word lines WL12 and WL13 respectively corresponding to the third and fourth selected fail row addresses sFRA2 and sFRA3 from the low level to the high level and may replace each of the 13th and 14th word lines WL12 and WL13 with the redundancy word line (e.g., the 13th and 14th word lines WL12 and WL13 may be replaced with the third and fourth redundancy word lines RWL2 and RWL3 in FIG. 3B, respectively).

The flag bit FG corresponding to each of the (k−1)-th and k-th selected fail row addresses sFRAk−2 and sFRAk−1 may remain at the low level.

Figure 7A:
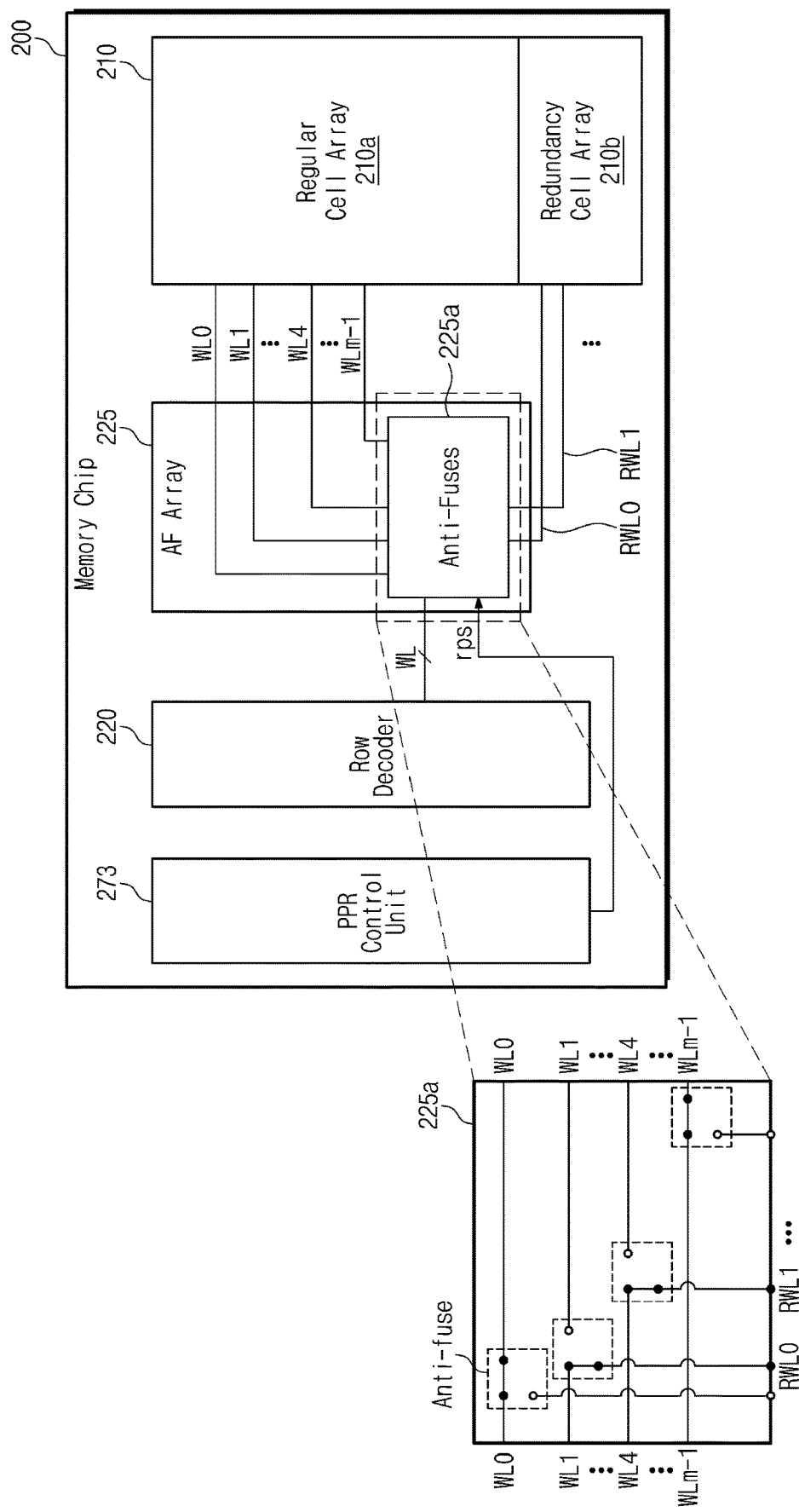
FIGS. 7A and 7B are diagrams illustrating a memory chip in which an anti-fuse (AF) array is further included, according to some embodiments of the present disclosure.
Figure 7B:
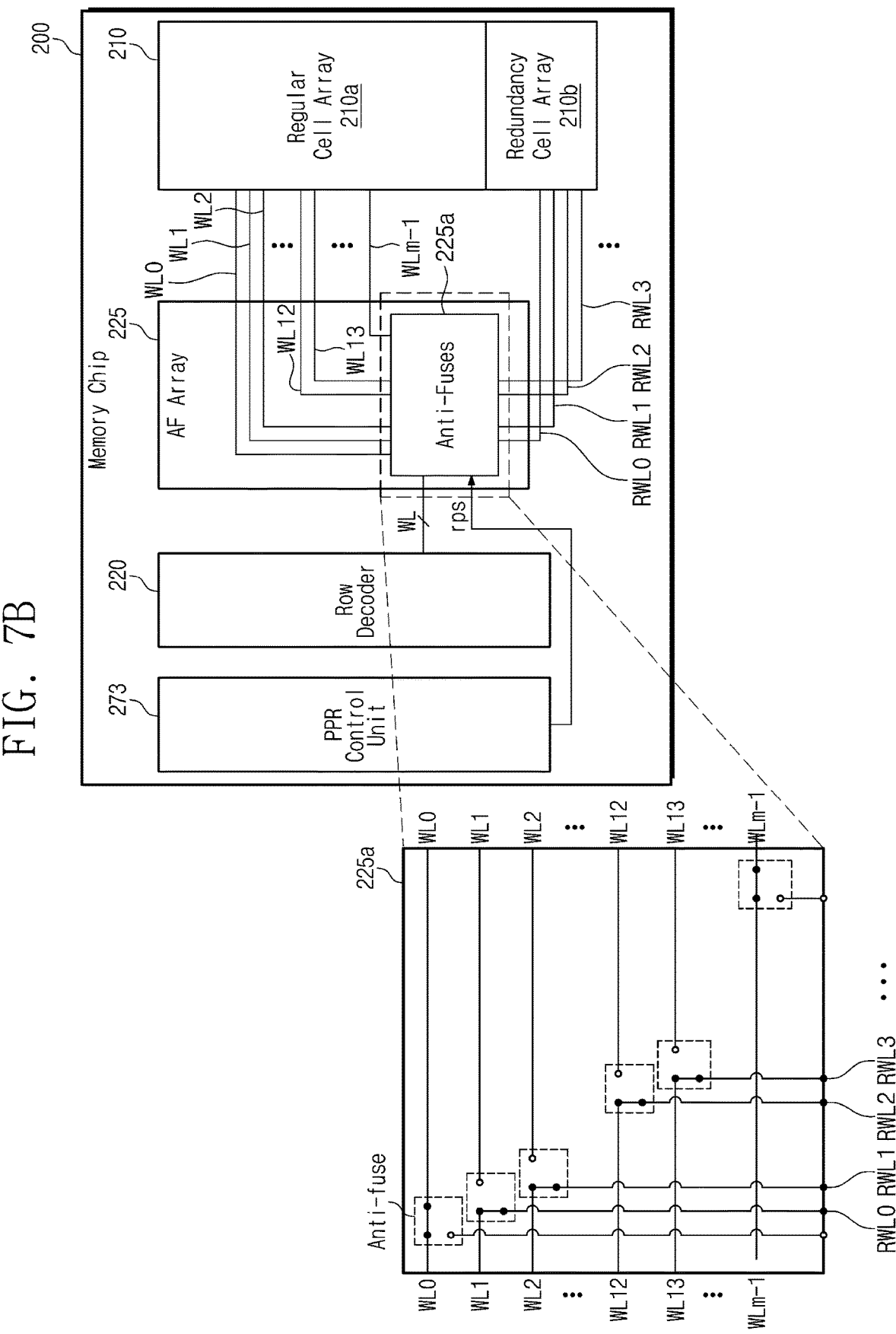

FIGS. 7A and 7B are diagrams illustrating a memory chip in which an anti-fuse (AF) array is further included, according to some embodiments of the present disclosure. In some embodiments, FIG. 7A shows the memory chip 200 that operates in the first PPR mode executed in response to the PPR command. FIG. 7B shows the memory chip 200 that operates in the second PPR mode executed in response to the PPR command.

For brief of description, in FIGS. 7A and 7B, the some components other than the memory cell array 210, the row decoder 220, and the PPR control unit 273 included in the memory chip 200 of FIG. 2 may be omitted. Because the memory cell array 210, the row decoder 220, and the PPR control unit 273 are described with reference to FIG. 2, additional description may be omitted to avoid redundancy.

FIGS. 7A and 7B show a connection relationship between the row decoder 220, an anti-fuse array 225, and the memory cell array 210 and show a plurality of anti-fuses 225a included in the anti-fuse array 225 in detail.

Referring to FIGS. 2 to 7B, the memory chip 200 may further include the anti-fuse array 225.

The anti-fuse array 225 may include a plurality of anti-fuses 225a. The plurality of anti-fuses 225a may operate in response to the repair signal rps provided from the PPR control unit 273.

The plurality of anti-fuses 225a may be connected to the row decoder 220 through the plurality of word lines WL and may be connected to the plurality of regular word lines WL0 to WLm−1 connected to the plurality of memory cells of the memory cell array 210 before the repair signal rps is applied. The memory cell array 210 may include a regular cell array 210a including the plurality of regular memory cells and a redundancy cell array 210b including the plurality of redundancy memory cells.

FIG. 7A will be described with reference to the first cell array Cell Array 0 of FIG. 3A. The description given with reference to FIG. 6A may be omitted.

The second word line WL1 may be replaced with the first redundancy word line RWL0 in response to the repair signal rps corresponding to the flag bit FG of the second word line WL1 by an anti-fuse connected to the second word line WL1 from among the plurality of anti-fuses 225a.

The anti-fuse that has been connected with the second word line WL1 may be electrically cut off, and the anti-fuse may be connected (e.g., electrically connected) to the first redundancy word line RWL0 used to replace the second word line WL1.

The fifth word line WL4 may be replaced with the second redundancy word line RWL1 in response to the repair signal rps corresponding to the flag bit FG of the fifth word line WL4 by an anti-fuse connected to the fifth word line WL4 from among the plurality of anti-fuses 225a.

The anti-fuse that has been connected with the fifth word line WL4 may be electrically cut off, and the anti-fuse may be connected (e.g., electrically connected) to the second redundancy word line RWL1 used to replace the fifth word line WL4.

FIG. 7B will be described with reference to the first cell array Cell Array 0 of FIG. 3B. The description given with reference to FIG. 6B may be omitted.

The second word line WL1 may be replaced with the first redundancy word line RWL0 in response to the repair signal rps corresponding to the flag bit FG of each of the second and third word lines WL1 and WL2 by an anti-fuse connected to each of the second and third word lines WL1 and WL2 from among the plurality of anti-fuses 225a. In this case, the third word line WL2 may be replaced with the second redundancy word line RWL1.

A first anti-fuse that has been connected with the second word line WL1 may be electrically cut off, and the first anti-fuse may be connected (e.g., electrically connected) to the first redundancy word line RWL0 used to replace the second word line WL1. Also, a second anti-fuse that has been connected with the third word line WL2 may be electrically cut off, and the second anti-fuse may be connected (e.g., electrically connected) to the second redundancy word line RWL1 used to replace the third word line WL2.

The 13th word line WL12 may be replaced with the third redundancy word line RWL2 in response to the repair signal rps corresponding to the flag bit FG of each of the 13th and 14th word lines WL12 and WL13 by an anti-fuse connected to each of the 13th and 14th word lines WL12 and WL13 from among the plurality of anti-fuses 225a. In this case, the 14th word line WL13 may be replaced with the fourth redundancy word line RWL3.

A third anti-fuse that has been connected with the 13th word line WL12 may be electrically cut off, and the third anti-fuse may be connected (e.g., electrically connected) to the third redundancy word line RWL2 used to replace the 13th word line WL12. Also, a fourth anti-fuse that has been connected with the 14th word line WL13 may be electrically cut off, and the fourth anti-fuse may be connected (e.g., electrically connected) to the fourth redundancy word line RWL3 used to replace the 14th word line WL13.

That is, adjacent anti-fuses may simultaneously operate in response to the repair signal rps provided from the PPR control unit 273 based on successive (e.g., adjacent) selected fail row addresses.

Figure 8:
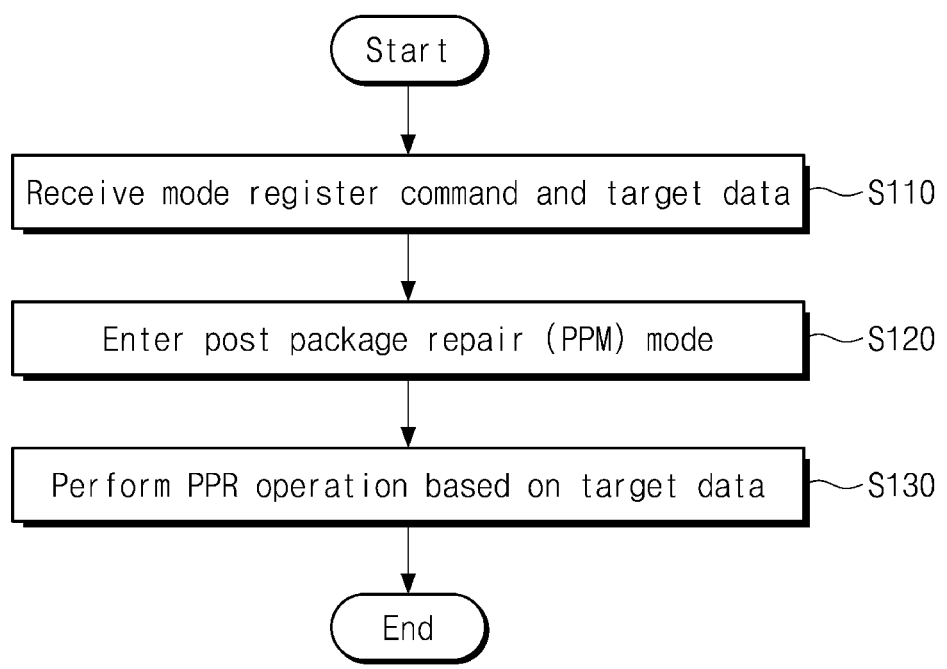
FIG. 8 is a flowchart of an operating method of a memory chip according to some embodiments of the present disclosure.

FIG. 8 is a flowchart of an operating method of a memory chip according to some embodiments of the present disclosure. Referring to FIGS. 2 to 8, in operation S110, the memory chip 200 may receive a mode register command and target data TD (e.g., information about the number of target fail cells) from the memory controller 20. In some embodiments, the mode register command may include the PPR command that allows the memory chip 200 to operate in the first PPR mode or the second PPR mode.

In operation S120, the memory chip 200 may enter the PPR mode executed in response to the PPR command. In response to the PPR command, the memory chip 200 may enter one of the first PPR mode in which a repair address is generated based on one selected fail row address or the second PPR mode in which a repair signal is generated based on successive (e.g., adjacent) selected fail row addresses.

In operation S130, the memory chip 200 may perform the PPR operation based on the target data TD. The memory chip 200 may compare the target data TD with the number of fail cells indicated by a row address and may selectively perform the PPR operation depending on a comparison result.

Figure 9:
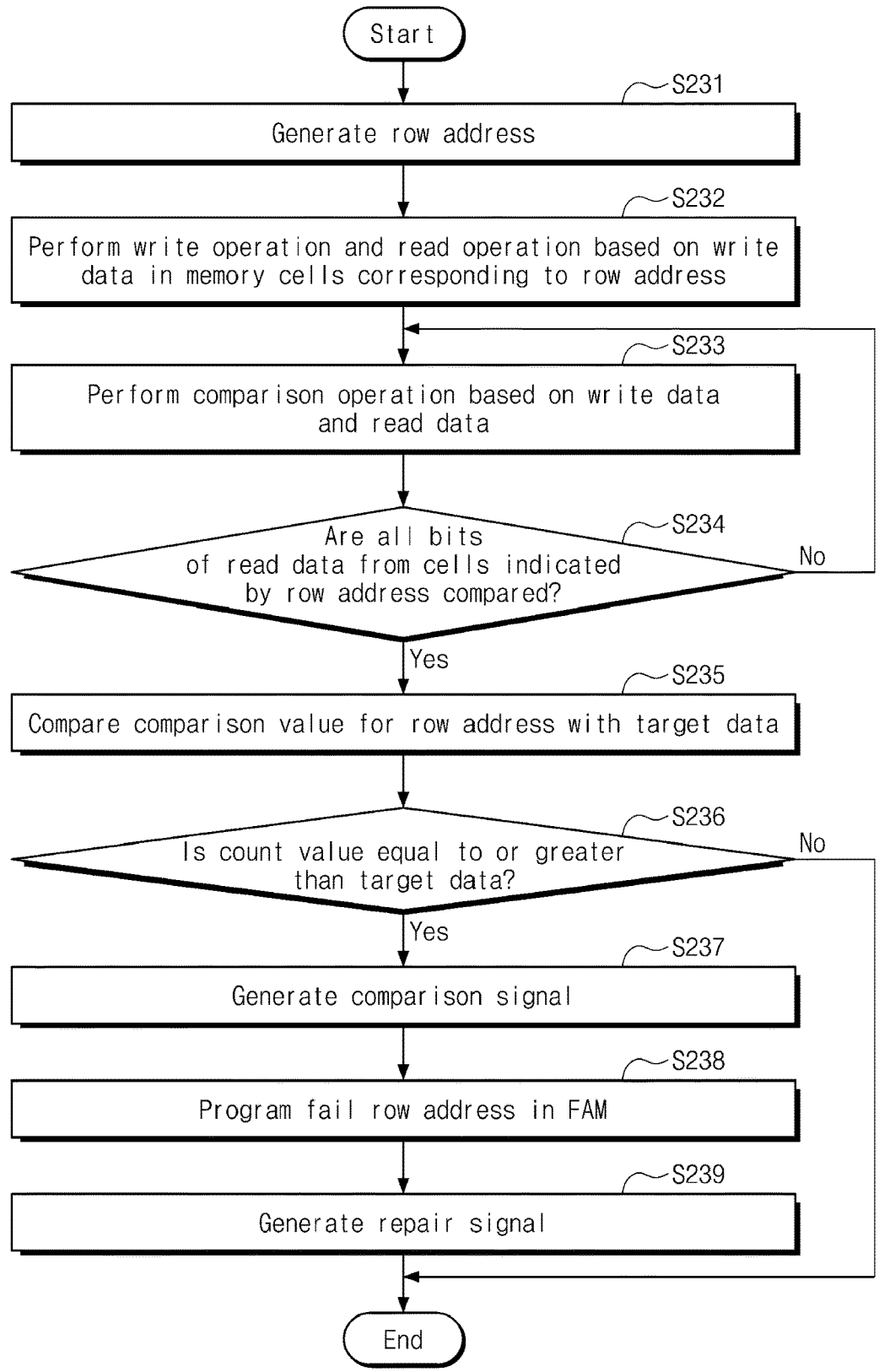
FIG. 9 is a flowchart of an operating method of a memory chip according to some embodiments of the present disclosure.

FIG. 9 is a flowchart of an operating method of a memory chip according to some embodiments of the present disclosure. Operation S130 of FIG. 8 will be described in detail with reference to FIG. 9. How the memory chip operates in the first PPR mode executed in response to the PPR command will be described with reference to FIG. 9.

Referring to FIGS. 2 to 9, in operation S231, the memory chip 200 may generate a row address. The generated row address may be different from an address received from the memory controller 20.

In operation S232, the memory chip 200 may perform the write operation and the read operation of the write data with respect to memory cells corresponding to the row address.

In operation S233, the memory chip 200 may perform the comparison operation based on the write data and the read data obtained through the read operation. The memory chip 200 may determine whether logical values of each of corresponding bit pairs of the write bits of the write data and the read bits of the read data coincide with each other.

When it is determined in operation S234 that all the read bits of the read data obtained from the memory cells indicated by the row address are compared, operation S235 and operation S26 may be performed. When it is determined in operation S234 that at least some of the read bits of the read data are not compared, operation S233 and operation S234 may be repeated.

When it is determined in operation S234 that all the read bits of the read data obtained from the memory cells indicated by the row address are compared, in operation S235, the memory chip 200 may compare the comparison result associated with the row address with the target data TD. The memory chip 200 may store a count value obtained by counting the number of fail bits. In some embodiments, the comparison result may include the count value.

When it is determined in operation S236 that the count value is equal to or greater than the target data TD, operation S237 to operation S239 may be performed. When it is determined in operation S236 that the count value is smaller than the target data TD, the procedure may end.

When the count value is equal to or greater than the target data TD, in operation S237, the memory chip 200 may generate a comparison signal.

When the comparison signal is generated, in operation S238, the memory chip 200 may program the row address in the fail address memory 275 as a selected fail row address.

In operation S239, the memory chip 200 may generate a repair signal based on the selected fail row address. The memory chip 200 may replace a normal word line corresponding to the selected fail row address with a redundancy word line based on the repair signal. That is, the memory chip 200 may generate a repair row address corresponding to the redundancy word line.

Afterwards, when a command for writing data at the row address corresponding to the selected fail row address is received from the memory controller 20, the memory chip 200 may write the data at a redundancy page corresponding to the redundancy word line used to replace a word line corresponding to the row address (e.g., the selected fail row address).

According to some embodiment of the present disclosure, a memory device, an electronic device including the memory device, and an operating method of the memory device may make it possible to selectively store a fail address corresponding to a word line or a bit line connected to at least one fail cell. The memory device may replace only the selectively stored fail address with a repair address. Accordingly, the performance of repair of the memory device with the limited size may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
a plurality of memory chips,
wherein each of the plurality of memory chips includes:
   a memory cell array including a plurality of memory cells that are connected to a plurality of word lines and a plurality of bit lines;
   a row decoder connected to the memory cell array through the plurality of word lines;
   a sense amplifier and write driver connected to the memory cell array through the plurality of bit lines; and
   a logic circuit that is configured to read data from and/or write data to the memory cell array based on a command and an address received from a controller, wherein, in response to a post package repair (PPR) command and a target value received from the controller, each of the plurality of memory chips is configured to:
perform a write operation of first write data with respect to memory cells that correspond to a row address generated in a PPR mode executed in response to the PPR command, and perform a read operation of the memory cells that correspond to the row address, resulting in first read data;
generate a comparison signal based on a result of comparing the first write data and the first read data;
program the row address corresponding to the comparison signal as a selected fail row address based on the target value; and
write the first write data in redundancy memory cells, which are connected to a redundancy word line that is configured to replace a fail word line corresponding to the selected fail row address, from among the plurality of memory cells.

2. The memory device of claim 1, wherein the target value indicates a number of target fail cells among the memory cells that correspond to the row address.

3. The memory device of claim 1, wherein each of the plurality of memory chips further includes:
a pass/fail check circuit, and
wherein the pass/fail check circuit is configured to generate a bit comparison signal by comparing logical values of each of corresponding bit pairs of first bits of the first write data and second bits of the first read data, respectively.

4. The memory device of claim 3, wherein the bit comparison signal includes a plurality of comparison bits,
wherein each of the plurality of comparison bits has a first logical value or a second logical value depending whether the logical values of each of the bit pairs coincide with each other, and
wherein the pass/fail check circuit is configured to count a number of fail bits, the fail bits are comparison bits that have the second logical value from among the plurality of comparison bits.

5. The memory device of claim 4, wherein, the pass/fail check circuit is configured to generate the comparison signal when the number of fail bits is equal to or greater than the target value.

6. The memory device of claim 5, wherein, the logic circuit is configured to store the row address as the selected fail row address when the logic circuit receives the comparison signal.

7. The memory device of claim 1, wherein the logic circuit includes a flag table storing a plurality of flag bits indicating availability of each of redundancy pages of the redundancy memory cells, and
wherein, the logic circuit is configured to change a flag bit among the plurality of flag bits corresponding to the selected fail row address from a low level to a high level when the selected fail row address is programmed.

8. The memory device of claim 7, wherein the logic circuit is configured to write the first write data in the redundancy memory cells, which are connected to the redundancy word line that is configured to replace the fail word line, based on the flag bit.

9. The memory device of claim 1, wherein each of the plurality of memory chips further includes:
an anti-fuse array connected to the memory cell array through the plurality of word lines, and
wherein the logic circuit is configured to control the anti-fuse array based on the selected fail row address.

10. The memory device of claim 9, wherein, the logic circuit is configured to generate a repair signal when the selected fail row address is programmed, and
wherein the logic circuit is configured to control at least one of anti-fuses included in the anti-fuse array in response to the repair signal.

11. The memory device of claim 10, wherein the logic circuit is configured to select the redundancy word line that is configured to replace the fail word line, based on the repair signal.

12. The memory device of claim 1, wherein, before the PPR command is received from the controller, the first write data includes data bits of a specific pattern stored in each of the plurality of memory chips.

13. An operating method of a memory device which includes a memory chip including a plurality of memory cells, the method comprising:
receiving, by the memory chip, a PPR command and a target value from a controller;
entering, by the memory chip, a PPR mode in response to the PPR command; and
performing, by the memory chip, a PPR operation based on the target value,
wherein the performing a PPR operation includes:
writing first write data in memory cells corresponding to a row address, and read the memory cells corresponding to the row address, resulting in first read data;
generating a comparison signal based on a result of comparing the first write data and the first read data;
programming the row address corresponding to the comparison signal as a selected fail row address based on the target value; and
generating a repair signal when the selected fail row address is generated.

14. The method of claim 13, wherein, before the PPR command is received, the first write data includes data bits of a specific pattern stored in the memory chip, and
wherein the target value indicates a number of target fail cells among the memory cells.

15. The method of claim 13, wherein the generating the comparison signal includes:
generating a bit comparison signal by comparing logical values of each of corresponding bit pairs of first bits of the first write data and second bits of the first read data, respectively;
counting a number of fail bits in the bit comparison signal; and
generating the comparison signal when the number of the fail bits is equal to or greater than the target value.

16. The method of claim 15, further comprising:
programming the row address as the selected fail row address when the comparison signal is generated.

17. The method of claim 13, wherein the memory chip includes a flag table storing a flag bit indicating availability of a redundancy page, and
wherein the programming the row address as the selected fail row address includes:
changing a status of the flag bit corresponding to the selected fail row address from a low level to a high level.

18. The method of claim 13, wherein the generating the repair signal includes:
selecting a redundancy word line for replacing a fail word line corresponding to the selected fail row address.

19. An electronic device comprising:
a plurality of memory devices; and
a memory controller that is configured to transmit a command and an address to the plurality of memory devices,
wherein each of the plurality of memory devices includes a plurality of memory chips,
wherein each of the plurality of memory chips includes:
- a memory cell array including a plurality of memory cells connected to a plurality of word lines and a plurality of bit lines;
- a row decoder connected to the memory cell array through the plurality of word lines;
- a sense amplifier and write driver connected to the memory cell array through the plurality of bit lines; and
- a logic circuit that is configured to read or write data from or in the memory cell array based on the command and the address received from the memory controller, wherein, in response to a post package repair (PPR) command and a target value received from the memory controller, each of the plurality of memory chips is configured to:

perform a write operation of first write data with respect to memory cells among the plurality of memory cells corresponding to a row address generated in a PPR mode executed in response to the PPR command, and perform a read operation of the memory cells among the plurality of memory cells corresponding to the row address, resulting in first read data;

generate a comparison signal based on a result of comparing the first write data and the first read data;

program the row address corresponding to the comparison signal as a selected fail row address; and write the first write data in redundancy memory cells, which are connected to a redundancy word line that is configured to replace a fail word line corresponding to the selected fail row address, from among the plurality of memory cells.

20. The electronic device of claim 19, wherein, before the PPR command is received, the first write data includes data bits of a specific pattern stored in each of the plurality of memory chips.

* * * * *